United States Patent
DeGroot et al.

(10) Patent No.: US 7,045,111 B1
(45) Date of Patent: May 16, 2006

(54) HIGH YIELD CO-PRODUCTION OF ANHYDROUS HYDROGEN BROMIDE AND SODIUM BISULFATE

(75) Inventors: Richard J. DeGroot, Southfield, MI (US); Dov Shellef, Great Neck, NY (US)

(73) Assignee: Poly Systems USA, Inc., Great Neck, NY (US)

( * ) Notice: Subject to any disclaimer, the term of this patent is extended or adjusted under 35 U.S.C. 154(b) by 0 days.

(21) Appl. No.: 11/201,660

(22) Filed: Aug. 11, 2005

Related U.S. Application Data

(63) Continuation-in-part of application No. 11/029,976, filed on Jan. 5, 2005.

(60) Provisional application No. 60/628,813, filed on Nov. 17, 2004.

(51) Int. Cl.
C01D 5/02 (2006.01)
C01B 7/09 (2006.01)

(52) U.S. Cl. ............... 423/520; 423/482; 423/488; 423/551

(58) Field of Classification Search ........... 423/520, 423/481, 482, 488, 551
See application file for complete search history.

(56) References Cited

U.S. PATENT DOCUMENTS

| | | | |
|---|---|---|---|
| 1,379,731 A * | 5/1921 | Theimer | 423/482 |
| 2,143,223 A * | 1/1939 | Heath | 423/503 |
| 2,339,330 A * | 1/1944 | Gebhart | 252/193 |
| 2,359,221 A * | 9/1944 | Kenaga | 423/500 |
| 2,705,670 A * | 4/1955 | Chao | 423/482 |
| 2,762,689 A * | 9/1956 | Giraitis et al. | 423/482 |
| 3,445,188 A * | 5/1969 | Heintz et al. | 423/482 |
| 4,045,543 A * | 8/1977 | Sardisco | 423/482 |
| 4,052,255 A | 10/1977 | Hackbarth et al. | 159/4 B |
| 4,187,617 A | 2/1980 | Becker, Jr. et al. | 34/57 R |
| 4,371,512 A * | 2/1983 | Sardisco et al. | 423/551 |
| 4,451,330 A | 5/1984 | Vitner | 159/48.2 |
| 5,324,501 A * | 6/1994 | Koehnk et al. | 423/555 |
| 6,223,455 B1 | 5/2001 | Chickering, III et al. | 34/578 |
| 6,692,716 B1 * | 2/2004 | Phinney | 423/422 |
| 6,811,763 B1 * | 11/2004 | Bourgeois et al. | 423/482 |
| 2004/0067191 A1 * | 4/2004 | Bourgeois et al. | 423/482 |
| 2004/0067192 A1 * | 4/2004 | Kenneally et al. | 423/482 |
| 2005/0135990 A1 * | 6/2005 | Schaefer et al. | 423/482 |

* cited by examiner

Primary Examiner—Stanley S. Silverman
Assistant Examiner—Ardith E. Hertzog
(74) Attorney, Agent, or Firm—Michael W. Ferrell; Aaron L. Webb

(57) ABSTRACT

A process for co-producing anhydrous hydrogen bromide and a purified bisulfate salt by (a) reacting a bromide salt with sulfuric acid to produce crude hydrogen bromide and crude bisulfate salt; (b) purifying the crude hydrogen bromide to produce anhydrous hydrogen bromide; and (c) removing bromide from the crude bisulfate salt to form a purified bisulfate salt. There are also provided improvements in the bisulfate purification and bromine removal, whereby bromine is removed from the system by a distillation process and the bromide is removed from the crude bisulfate via a spray drying process.

28 Claims, 3 Drawing Sheets

HIGH YIELD CO-PRODUCTION OF ANHYDROUS HYDROGEN BROMIDE AND SODIUM BISULFATE

CROSS-REFERENCE TO RELATED APPLICATIONS

This application is a continuation-in-part of U.S. patent application Ser. No. 11/029,976, filed on Jan. 5, 2005, of the same title, which claims the benefit of priority of U.S. Provisional Patent Application No. 60/628,813, filed Nov. 17, 2004, entitled "Method For The Co-Production of Hydrogen Bromide and Low Bromide Sodium Bisulfate from Bromide Salts and Sulfuric Acid," the entireties of which are incorporated herein by reference.

FIELD OF THE INVENTION

The present invention is directed generally to the co-production of anhydrous hydrogen bromide and low bromide sodium bisulfate. More specifically, there is provided in accordance with the present invention a method of producing anhydrous hydrogen bromide and purified sodium bisulfate from a sodium bromide slurry and sulfuric acid.

BACKGROUND OF THE INVENTION

Anhydrous hydrogen bromide is widely used as an intermediate in the chemical industry. It is utilized in the production of inorganic bromides by reaction with metal hydroxides, oxides, or carbonates; in the production of organic bromides by reaction with alkyl alcohols or alkenes; and as a catalyst for oxidations, alkylations, and condensations in organic chemistry. Sodium bisulfate is likewise widely used in textiles and chemical processing and as a preservative.

The production of hydrogen bromide from sodium bromide is known. The reaction typically includes adding sulfuric acid to sodium bromide and water according to equation (I):

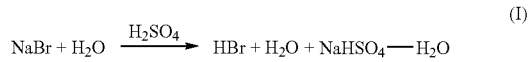

(I)

One drawback of known production methods for producing anhydrous hydrogen bromide is that a high boiling water/HBr azeotrope stream is produced. The azeotrope is difficult and expensive to purify as will be appreciated by one of skill in the art.

U.S. Pat. No. 1,379,731 to Theimer, describes a method to produce a stream of 48% HBr/water azeotrope of aqueous hydrogen bromide. This azeotropic solution has only limited commercial application due to the presence of the water. One approach to converting this azeotropic stream of 48% hydrogen bromide to anhydrous hydrogen bromide is to utilize pressure swing distillation where one column at high pressure will produce an aqueous stream of hydrogen bromide greater than 48%. A second column at lower pressure will produce a stream of hydrogen bromide with a concentration of less than 48%. Such a system will effectively break the azeotrope and produce an essentially anhydrous stream of hydrogen bromide; however pressure swing distillation requires the distillation of acidic aqueous streams under high pressure. This process will have high costs for two reasons.

First, the process must be carried out in equipment designed to withstand the high pressures and corrosive environment. Second, energy costs are high due to the high reflux ratios required to affect the distillation process as well as the high heats of evaporation of aqueous systems.

U.S. Pat. No. 2,705,670 to Chao also discloses a continuous process for producing HBr from sodium bromide; however, that continuous process produces amounts of molecular bromine ($Br_2$) and sulfur dioxide which range from about 0.035% to about 1% or more. Indeed, Applicants have observed that duplication of the process in Chou results in excessive amounts of bromine. The '670 patent also contains what appear to be batchwise examples, but does not address handling of the HBr azeotrope or purification of bisulfate salt; features critical to the commercial usefulness of the present invention.

The production of unwanted bromine and sulfur dioxide is believed due to the fact that sulfuric acid reacts with HBr to form the undesirable products in accordance with equation II:

II when the salt is added to aqueous reactants as described in the reference. The present Applicants have also noticed that the unwanted production of bromine can occur due to the presence of bromates in the NaBr feed.

The need for a high-yield, environmentally friendly process to anhydrous hydrogen bromide utilizing salts is seen by the fact that large producers of bromide salt streams recycle them through bromine suppliers. For example, in St. Louis, Mo. a large chemical manufacturer produces 150 million pounds of a 44% NaBr solution. To convert this to a usable reagent they must ship it to Great Lakes Chemical in Eldorado, Ark. for reprocessing through conventional chlorination routes (see U.S. Pat. Nos. 2,143,223 and 2,359,221).

The present invention is directed generally to an improved high-yield slurry process which produces both anhydrous hydrogen bromide and low-bromide bisulfate salt from a bromide salt source. In the inventive process, bromide salt reacts with sulfuric acid to produce crude HBr and crude bisulfate salt. The crude HBr stream contains water and may also contain a small amount of bromine. The crude bisulfate salt contains some bromide. The crude HBR and crude bisulfate are processed into anhydrous HBr and purified bisulfate, respectively.

Co-production of the two products minimizes waste and enables economical re-processing of bromide salt streams. The process is also capable of being run batchwise which allows for processing of a variety of starting materials and allows for re-processing of the azeotrope as will be seen in the examples appearing hereinafter. In certain circumstances it may be necessary to reduce the minor amounts of bromine that accumulate in the process. This can arise, for example, when bromates are present in the bromide salt feed. Bromine is an undesirable component in the system because it is a highly reactive impurity. Also, due to the presence of bromide in the bisulfate product, there exists a need in the process to purify the bisulfate salt in a cost-effective manner.

SUMMARY OF THE INVENTION

In one aspect, the present invention provides an improvement to the process whereby the crude hydrogen bromide produced by the reaction is separated into anhydrous hydrogen bromide and aqueous hydrogen bromide which contains at least a finite amount of bromine, and removing the bromine from the aqueous hydrogen bromide in a distillation process by adding water to form a bromine/water azeotrope and azeotropically distilling off the bromine. Typically, the bromide salt is sodium bromide and the bisulfate salt is sodium bisulfate.

The bromine may be removed from the aqueous HBr in a column where the water is added in the top portion of the column and the aqueous HBr is added in the bottom portion of the column. The distillation procedure suitably produces a top product comprising a bromine/water mixture and a bottom product comprising debrominated aqueous hydrogen bromide having less than about 500 ppm bromine. Preferably, the debrominated HBr contains less than about 300 ppm bromine, and even more preferably contains less than 100 ppm bromine.

The debrominated HBr is generally a bromide/water azeotrope and may be recycled back to the reactor. Typically, the bromine/water mixture is condensed and separated to provide a stream comprising predominantly water and a stream comprising water saturated bromine. The stream comprising mostly water may be recycled back to the distillation column.

Suitably, the bromine is removed from the aqueous hydrogen bromide intermittently. In preferred embodiments, the bromide salt is reacted in a batch process and the reactor is optionally charged with aqueous hydrogen bromide. For batchwise processing, the bromine may be allowed to accumulate and then removed from the aqueous hydrogen bromide in periods of about once per every 5 to 10 batches. In some circumstances it may be suitable to remove the bromine even less frequently.

In another aspect, the present invention provides for an improvement to the process whereby bromide in the bisulfate salt is removed via spray drying, wherein the bisulfate salt is dispersed into droplets and the droplets are contacted with a heated gas. Here again, the bromide salt is typically sodium bromide and the bisulfate salt is sodium bisulfate.

In some embodiments, water is added to the bisulfate salt prior to the spray drying process. Typically, the water is added in amounts needed for the bisulfate salt to form a complete hydrate. The bromide may also be removed by processing the bisulfate in a plurality of spray drying processes. Typically, the bromide that is removed is recombined with the crude hydrogen bromide from the reactor.

Preferably the heated gas in the spray drying process comprises air and is heated to a temperature of between 100° C. and 150° C., and even more preferably between 100° C. and 140° C.

Typically the purified bisulfate salt contains less than 1.5 weight percent bromide and in preferred embodiments contains less than 0.5%, 0.1%, and even less than 0.01% bromide.

BRIEF DESCRIPTION OF THE DRAWINGS

The process of the invention is illustrated and described in connection with the following figures.

DETAILED DESCRIPTION OF THE INVENTION

The invention is described in detail below in connection with particular features. Modifications within the spirit and scope of the present invention, set forth in the appended claims, will be readily apparent to those of skill in the art.

As previously explained, the production of hydrogen bromide, from sodium bromide, is a well known process. The method comprises the addition of sulfuric acid to sodium bromide and water according to the process (I):

It has been discovered through the course of this work that by concentrating a 44% solution of sodium bromide to a slurry of aqueous crystals, the reaction with sulfuric acid is readily carried out. The sodium bromide salt may be concentrated in a crystallizer to provide the salt feed. The fact that solid sodium bromide is present with small amounts of water affects three things:

1. It eliminates the formation of excessive amounts of bromine. Despite the fact that large amounts of solid sodium bromide are present the water inhibits the formation of bromine by dissolving the sulfuric acid before it can react with the solids;
2. It facilitates the handling of the solids. This is the case since chemical processing equipment is typically designed to handle slurries; and
3. The low water concentration allows for the production of hydrogen bromide at a concentration well above the azeotropic concentration of 48%.

Figure 1:
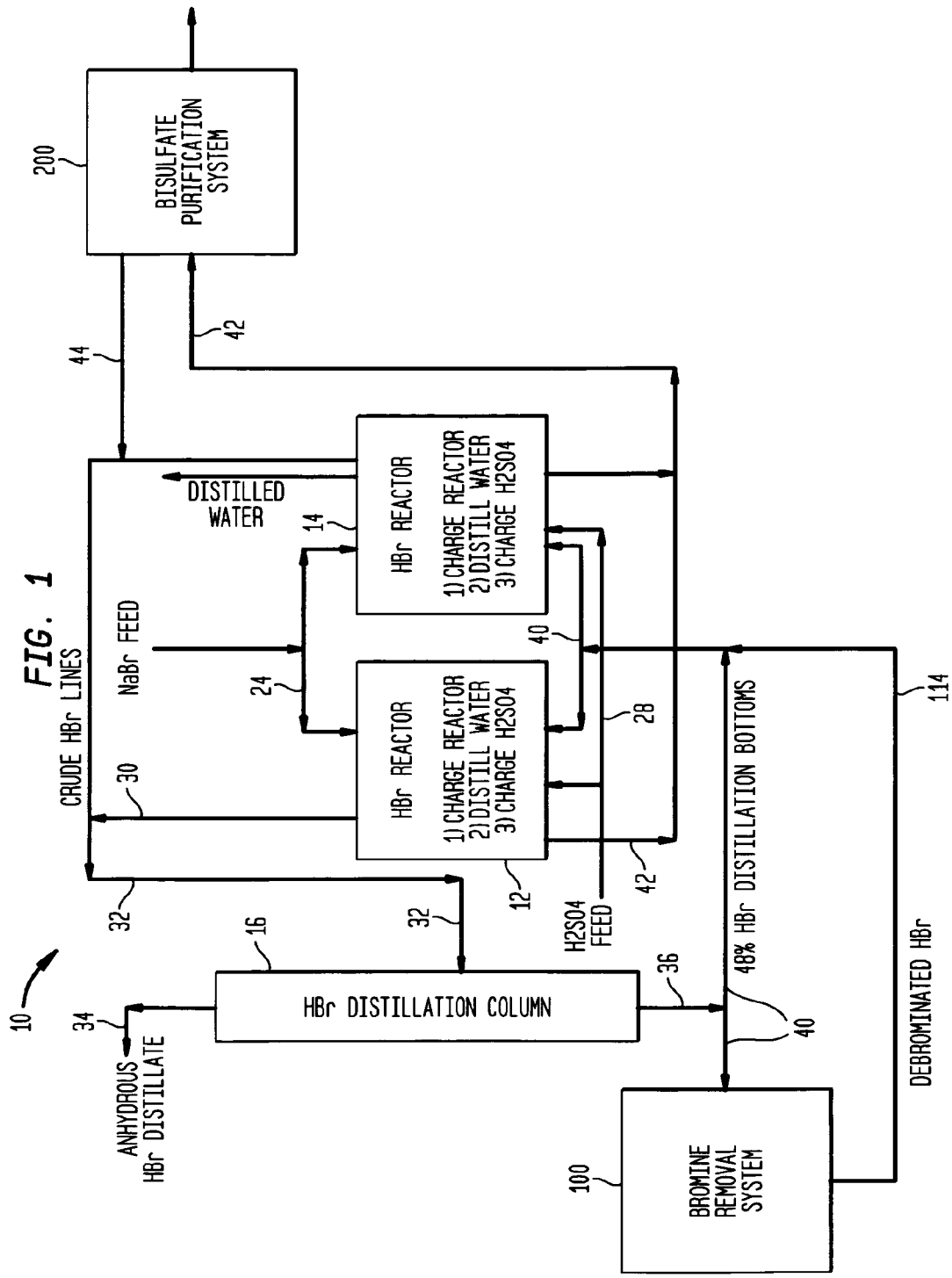
FIG. 1 is a schematic diagram illustrating an alternating batch process of the invention.
Figure 2:
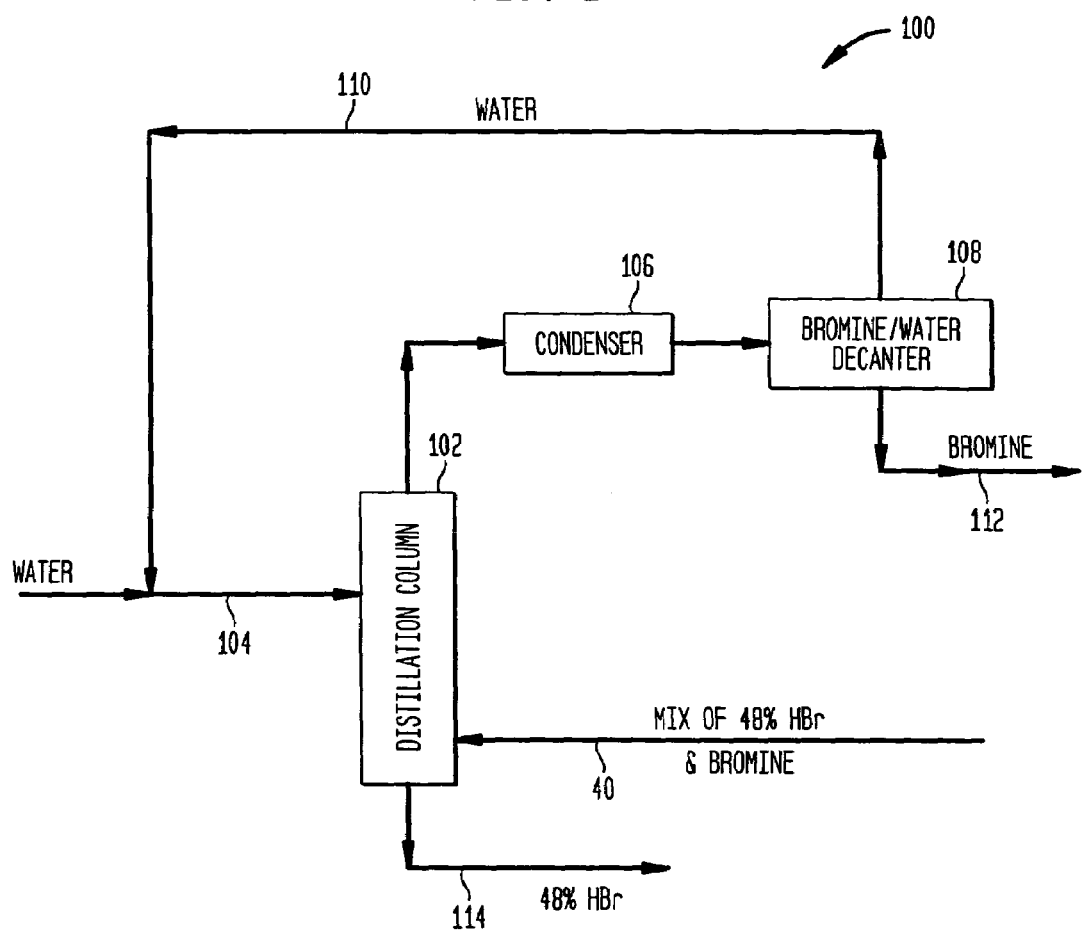
FIG. 2 is a schematic diagram which illustrates a bromine removal system according to the invention.
Figure 3:
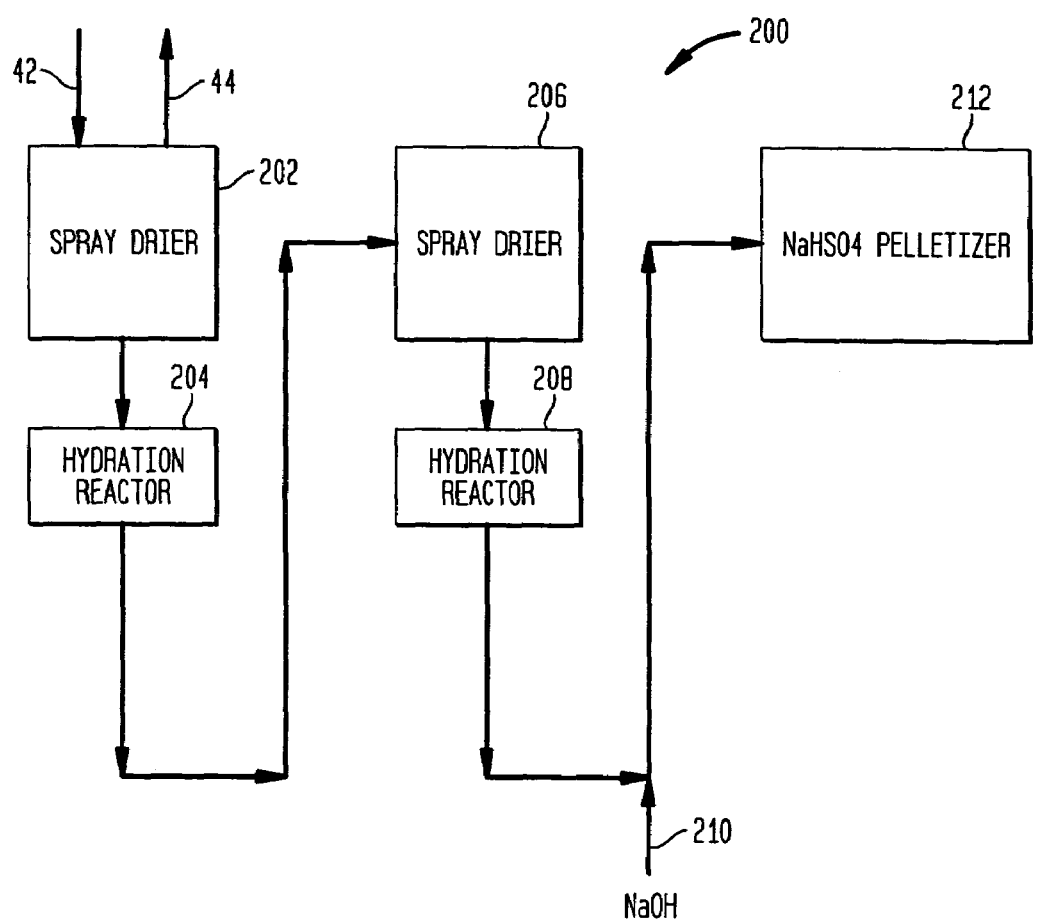
FIG. 3 is a schematic diagram illustrating a bisulfate purification system of the present invention.

Referring to FIGS. 1–3 there is shown schematically a suitable apparatus 10 for practicing the present invention. As shown in FIG. 1, apparatus 10 is an alternating batch apparatus with a first reactor 12 and a second reactor 14 as well as a drying column 16, bromine removal system 100, and a bisulfate purification system 200.

In order to run the reaction, reactor 12 is first charged with sodium bromide salt via line 24. The initial slurry of sodium bromide feed for this reaction can be made of:

1. Water and sodium bromide crystals;
2. 48% Hydrogen bromide and sodium bromide crystals;
3. Sodium bisulfate hydrate (mp 58 C) and sodium bromide crystals;
4. Sodium sulfate hydrate and sodium bromide crystals; and
5. Various mixtures of the above components.

Once the reactor is charged with sodium bromide salt, line 24 is closed off and sulfuric acid, preferably highly concentrated (>95%), is added to reactor 12 via line 28. The batchwise reaction of sodium bromide with sulfuric acid proceeds while crude HBr is withdrawn from reactor 12 via line 30. The crude HBr gas typically contains from about 0.5 to about 30 percent water, preferably less than 10 percent.

The crude HBr gas is fed to drying column 16 via line 32. Column 16 is a fractional distillation column which removes water from the crude product. Purified product is withdrawn at 34, wherein the anhydrous HBr has less than 1000 ppm water, preferably less than 100 ppm. A condensed 48% HBr/water azeotrope is withdrawn from column 16 at 36 and is recycled via line 40 to either reactor 12, reactor 14, or the bromine removal system 100. During batch processing of a bromide salt charge in reactor 12, it is preferable to feed the azeotrope to batch reactor 14.

The removal of bromine may be necessary if there is a build up of $Br_2$ in the system. As stated above, the presence of bromine can occur due to bromate impurities in the NaBr feed. It should be understood, then, that the presence of unwanted bromine in the system may occur frequently or, perhaps, only occasionally depending upon the makeup of the bromide salt feed. The HBr azeotrope 40 may be continuously fed to the bromine removal system 100, but is preferably only distilled intermittently to remove the bromine as needed. Desirably the bromine should be removed about once every 5–10 batches, or when the bromine level reaches about 1.0% or more.

When it is desired to remove the bromine from the system, the HBr bottom stream (b.p. 124° C.) is fed into a distillation column 102 near the bottom of the column, as shown in FIG. 2. A small stream of water 104 is added near the top of the column to form the bromine/water azeotrope (b.p. 58° C.). A bromine/water mixture comes off the top of the column and is sent to a condenser 106, where the mixture is condensed into liquid phase and allowed to separate in decanter 108. The water 110 is then recycled back to the column. The bromine stream 112, which is saturated with water (about 600 ppm), is removed from the system. The debrominated aqueous HBr 114 is taken off of the bottom of the column and reintroduced to either reactor 12 or reactor 14. Recycling the aqueous HBr from either the high boiling azeotrope 40 of column 16 or the debrominated aqueous HBr 114 of column 102, serves to minimize waste and maximize yield.

It is believed that the bromine removal system is effective because the addition of water at the top of the column promotes the formation of the water/HBr azeotrope and prevents or hinders aqueous HBr from dissolving in the $Br_2$ which exits the top of the column. The water/HBr azeotrope is taken off of the bottom of the column and a mixture of water and $Br_2$ exits out the top of the column. The bromine/water mixture which is removed from the top of the column may then be easily separated. Typically, the HBr at the bottom of the column contains less than about 500 ppm bromine, preferably less than 300 ppm bromine, and even more preferably less than about 100 ppm bromine.

As the bromide salt is being reacted in reactor 12, reactor 14 is provided with another charge of bromide salt and preferably with an HBr/water azeotrope from column 16 and/or column 102. The charge of reactor 14 is optionally dried while batch reactor 12 is provided with HBr. When a batch reaction is completed in reactor 12, that reactor is closed off and sulfuric acid is fed to reactor 14, starting processing of the next batch of bromide salt. It will be appreciated from the foregoing that while successive batches of bromide salts are processed batchwise in reactors 12 and 14, the drying column 16, bromine removal system 100, and bisulfate purification system 200 may be operated continuously, reducing capital costs for purification.

Regarding the bisulfate production of the present invention, while batch reactor 14 is producing product, the bisulfate (hydrate) salt is removed from reactor 12 once the reaction is complete, and fed via line 42 and to the bisulfate purification system 200. Once the primary reaction between the sodium bromide and sulfuric acid has been completed, a slight excess of sulfuric acid is typically added to the reaction bottoms. The excess of sulfuric acid assures that the bromide is present in the form of hydrogen bromide. Water may also be added to the crude bisulfate salt to facilitate bromide separation as will be appreciated from specific examples provided below.

FIG. 3 shows the bisulfate purification system 200. The bisulfate (hydrate) melt feed 42 is taken from the HBr reactor 12 into a first spray dryer 202. In alternative embodiments, the melt may also be fed to a column, an evaporator, or combinations thereof, to remove bromide, though spray drying is the preferred method. Using a spray drying process is advantageous because it can reduce processing and energy costs, while removing at least the same, if not more, moisture as other processes. Spray drying processes and apparatuses are well-known in the art. U.S. Pat. Nos. 6,223,455; 4,187,617; 4,052,255 and 4,451,330 disclose various processes and apparatuses for spray drying a slurry to produce solid particles. In typical spray-drying processes, a slurry or solution is dispersed into a stream of hot gas in the form of fine droplets or mist.

The droplets are generally formed in the spray drying chamber by passing the slurry through a spray nozzle, or high-speed disks or wheels. The hot gas, which is usually air, causes the droplets to flash off moisture. The moisture carries off the HBr from the bisulfate as the water/HBr azeotrope. Preferably, the spray dryer should disperse the bisulfate into smaller particles rather than larger particles, as the bromide may be more efficiently removed from smaller particles. The air may flow concurrently, countercurrently, or mixed-flow, in relationship to the droplets. In the inventive process, the air is preferably heated to a temperature of between about 100° C. and 150° C., A preferably between about 110° C. and 140° C. When contacted with the air, the droplets quickly dehydrate becoming small solid particles which are removed from the bottom of the tower. The solid particles are separated from the gas stream by various means such as a cyclone or a bag filter. There are numerous variables associated with the spray drying process, e.g., air flow rate, air velocity, temperature, nozzle pressure, feed consistency, etc. It should be understood that the specific parameters used would be routinely chosen by a person of skill in the art, depending on the desired processing conditions, bromide content, and other considerations. Desirably, the conditions of the spray drying process should be optimized to allow for efficient removal of the bromide from the bisulfate.

Once the crude bisulfate is spray dried, the bromide is evolved at stream 44 and recombined with the crude HBr stream 32. Preferably the removed bromide is in the form of the water/HBr azeotrope. If further removal of bromide is desired, additional water is then added to the sodium bisulfate at hydration reactor 204 and the mixture is subjected to another spray drying process 206. The bisulfate is rehydrated to allow for easy processability (the anhydrate melts at about 315° C. while the hydrate melts at about 58.5° C.), and also to promote the removal of bromide. Each successive spray drying will further decrease the amount of bromide in the crude bisulfate. Thus, the spray drying/hydration process may be repeated several times, depending on the desired amount of bromide content. The bromide content of the purified bisulfate should be below about 1.5%, preferably below 0.1%, and most preferably below about 0.01%. If desired, even lower values can be obtained by with additional spray drying/hydration steps.

After spray drying, the bisulfate is optionally rehydrated at reactor 208. Base is then added to the bromide-free bisulfate at 210 in order to neutralize residual acid, if needed, to bring the bisulfate salt to the desired specification. The bisulfate is then pelletized at 212 for sale as a commercial product. The bisulfate salt may also be dried prior to pelletizing if the bisulfate is to be sold as the anhydrate salt.

The invention is further illustrated in the Examples which follow.

EXAMPLE 1

Aqueous slurry with NaBr and water: A slurry of 258 gm sodium bromide and 58 gm water was prepared and added to a 500 ml round bottom flask. To this was added 238 gm of concentrated sulfuric acid over a period of 1.5 hours at a temperature of approximately 120° C. Upon addition of 15% of the sulfuric acid, hydrogen bromide gas began to off gas and was collected in a water trap. The reaction bottoms were then heated to 145° C. once all the sulfuric acid was added to drive off additional HBr.

The reaction effluents were as follows:
- 205 gm of HBr was collected and consisted of 90% HBr and 10% water.
- 334.3 gm of sodium bisulfate was collected and contained 4.0% Br—.

EXAMPLE 2

An aqueous slurry of NaBr in 48% HBr: A slurry of 600 gm sodium bromide and 110 gm of 48% aqueous hydrogen bromide was prepared and added to a 1000 ml round bottom flask. To this was added 637 gm of concentrated sulfuric acid over a period of 1.5 hours. The initial temperature at the beginning of the acid addition was 70° C. and was ramped up to 140° C. at the end of the acid addition. Hydrogen bromide was generated immediately upon the addition of sulfuric acid and was collected in a water trap.

The reaction effluents were as follows:
- 526 gm of HBr was collected and consisted of 90% HBr and 10% water.
- 820 gm of sodium bisulfate was collected and contained 3.9% Br—.

EXAMPLE 3

An aqueous mixture of NaBr and $NaHSO_4$—$H_2O$: A slurry of 600 gm sodium bromide with 62 gm of 48% aqueous hydrogen bromide 59 gm $NaHSO_4$ and 8 gm water was prepared and added to a 1000 ml round bottom flask. To this was added 638 gm of concentrated sulfuric acid over a period of 45 minutes. The temperature was held at 120° C. Hydrogen bromide was generated almost immediately upon the addition of sulfuric acid and was collected in a water trap.

The reaction effluents were as follows:
- 487 gm of HBr was collected and consisted of 98% HBr and 2% water.
- 887 gm of sodium bisulfate was collected.

EXAMPLE 4

Bromide reduction in $NaHSO_4$: The sodium bisulfate-hydrate bottoms stream from example 2 was held at 140° C. and 10" of vacuum was applied for 10 minutes. The bromide level was reduced from 3.9% to 0.36%. The sodium bisulfate-hydrate melt began to solidify due to reduction in concentration of the hydrate (the hydrate melts at 58° C. and the non-hydrated sodium bisulfate melts at greater than 315° C.). 50 gm of water was added to rehydrate the mixture and 20" of vacuum was again applied for 10 minutes. The bromide concentration was reduced from 0.36% to 0.061%.

EXAMPLE 5

Water Balance and Recycling $NaHSO_4$ Consisting of Reactions 5A and 5B:

Reaction 5A

A slurry of 800.0 gm sodium bromide and 128.0 gm water was prepared and added to a 1000 ml round bottom flask. To this was added 840 gm of concentrated sulfuric acid over a period of 70 minutes at a temperature of approximately 130° C. Upon addition of 15% of the sulfuric acid hydrogen bromide gas was generated and passed through a water condenser. The aqueous 48% HBr condensate was collected and the non-condensable HBr was collected in a water trap. The reaction bottoms were then heated to 145° C. after all the sulfuric acid was added to drive off additional HBr.

The reaction effluents were as follows:
- 478 gm of non-condensable HBr was collected and consisted of: 82% HBr, less than 300 ppm bromine and 18% water.
- 230 gm of condensed aqueous HBr was collected and consisted of: 58.6% HBr, 0.201% bromine, and 41.2% water.
- 1056 gm of sodium bisulfate (hydrate) was collected and contained 4.0% Br—.

Reaction 5B 857.2 gm of sodium bisulfate were removed from the reaction flask leaving 198.8 gm of sodium bisulfate (hydrate). To this were added 800 gm sodium bromide and the 230 gm of aqueous hydrogen bromide collected above. To this slurry was added 840 gm of concentrated sulfuric acid over a period of 60 minutes at a temperature of approximately 130° C. Hydrogen bromide gas was generated immediately upon the addition of the acid. The hydrogen bromide gas was passed through a water condenser and the aqueous hydrogen bromide condensate was collected. The non-condensable HBr was collected in a water trap. The reaction bottoms were then heated to 145° C. to drive off additional HBr.

The reaction effluents were as follows:
- 689 gm of non-condensable HBr was collected and consisted of: 99.9% HBr, less than 300 ppm bromides, and 0.1% water.
- 73 gm of condensed aqueous HBr was collected consisting of: 59.5% HBr, 0.352% bromides, and 40.1% water.
- 1303 gm of sodium bisulfate was collected and contained 4.0% Br—.

From this series of reactions it is evident that reacting NaBr in a slurry will allow for complete conversion of NaBr to HBr without a build up of the aqueous azeotropic hydrogen bromide. This is evident since the first reaction collected 230 gm of aqueous hydrogen bromide and the second collected only 73 gm.

It also shows that the reaction can successfully be carried out in a slurry of NaBr formed from the sodium bisulfate hydrate and aqueous hydrogen bromide. This will allow for the process to be carried out in an alternating batch reaction scheme which operates continuously, where one reactor will be used for acidification and a second for carrying out the steam distillation. Cycling between the two reactors will allow for a very efficient process.

EXAMPLE 6

Bromide Reduction in sodium bisulfate with water: To the 1303 gm of sodium bisulfate above was added 130 gm water and the mixture was distilled under a maximum of 14" of vacuum at a temperature of 141° C. (well above the HBr azeotrope temperature of 124° C. at atmospheric pressure). After removing 100 ml of water the bromides were reduced from 4.0% to 0.37%.

An additional 100 ml of water was added and the distillation above was repeated but under a maximum of 18.5" of vacuum at a temperature of 134° C. After removing an additional 100 ml of water the bromides were reduced from 0.37 to 0.12%.

An additional 50 ml of water was added and the distillation above was repeated but under a maximum of 20" of vacuum at 130° C. After removing an additional 90 ml of water, 50 mls that were added and 40 ml of water of hydration, the bromides were reduced from 0.12% to 0.03%.

Therefore, the use of water to remove bromides from sodium bisulfate is very effective. The process can be carried out as indicated above using liquid water. Once skilled in the art can adapt such a procedure to a continuous process using a column or using steam in place of water.

EXAMPLE 7

Bromide removal via spray drying: To simulate spray drying a 28.9 gm of crude $NaHSO_4$ was added to a 500 ml vacuum flask and heated to 125° C. The $NaHSO_4$ formed a thin film on the bottom of the flask. Quickly applying vacuum to this will simulate a spray dryer. 28" of vacuum was applied and held for 1 minute. The flask was then vented to the atmosphere and this application of 28" vacuum and venting were repeated two additional times. This process reduced the bromide concentration from 9.2% to 0.95%.

To these spray dried solids was added 3 ml water to re-hydrate the mixture. It was heated to 125° C. and all the solids were allowed to dissolve/melt. Vacuum was again applied as above. The bromides were reduced from 0.95% to 0.13%.

To the dried bottoms above were added 3 additional mls of water and the solids were allowed to dissolve/melt. Vacuum was applied as in the first step and the bromides were reduced to 0.0028%.

It should be noted that for this experiment it was necessary to wipe all the condensate from the side of the flask with a paper towel or other absorbent material. This condensate contains HBr/water stripped from the $NaHSO_4$ and condensed on the cold flask walls. In an actual spray dryer no condensate would form allowing for a more efficient bromide strip. This procedure proves the concept that a spray drier will remove bromides from the bisulfate.

ALTERNATE EMBODIMENTS

Additional embodiments of the inventive process for co-producing anhydrous hydrogen bromide and a purified bisulfate salt are also contemplated. For example, there is also provided a process comprising: (a) charging a batch reactor with a bromide salt slurry, wherein the slurry is more than 50% by weight bromide salt; (b) supplying hydrogen bromide to the reactor; (b) reacting the slurry with sulfuric acid in a batch reaction wherein bromide salt is consumed to produce crude hydrogen bromide and crude bisulfate salt, the crude bisulfate salt containing bromides; (d) purifying the crude hydrogen bromide to produce anhydrous hydrogen bromide; and (e) removing bromides from the crude bisulfate salt to form a purified bisulfate salt. In a preferred embodiment the bromide salt is sodium bromide and the bisulfate salt is sodium bisulfate. A convenient way to add the hydrogen bromide to the reactor is in the form of a water/HBr azeotrope or the hydrogen bromide charged to the reactor is derived from a water/HBr azeotrope.

Typically, the crude hydrogen bromide is purified by distillation and has less than 1,000 ppm water. More preferably, the purified hydrogen bromide has less than 500 ppm water, and even more preferably less than 100 ppm water.

Upon isolation, the crude bisulfate salt generally has less than 5 weight % bromide. To further purify the crude bisulfate, the crude bisulfate salt is acidified during purification and/or water is added to the bisulfate. Bromides are removed from the bisulfate salts by distillation through the utilization of the 48% water/HBr azeotrope. Preferably, the purified bisulfate salt has less than 1.0 weight percent bromide and more preferably the purified bisulfate salt has less than 0.25 weight percent bromide, and still more preferably has less than 0.1 weight percent bromide.

A salt slurry charged to the reactor may consist essentially of sodium bisulfate-hydrate and sodium bromide charged to the reactor or sodium sulfate and aqueous HBr. Additionally, it may be desirable to add a small amount of sulfuric acid to this initial reactor charge to help keep it fluid.

In cases where a water/HBr azeotrope is added to the sodium bromide slurry, hydrogen bromide is preferably charged to the reactor prior to reaction of the bromide salt with sulfuric acid.

In a batch process for producing anhydrous hydrogen bromide from a bromide salt and sulfuric acid, another aspect of the invention is the improvement comprising adding hydrogen bromide to a batch reactor prior to or concurrently with reaction of the bromide salt and sulfuric acid.

In a batch process for producing hydrogen bromide and a bisulfate salt from a bromide salt and sulfuric acid, still yet another aspect of the invention is the improvement comprising purifying the bisulfate salt of bromide such that the purified bisulfate salt has a bromide content of less than 1.0%; preferably the bisulfate salt has a bromide content of less than 0.5%.

While the invention has been described in connection with several examples, modifications to these examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. In a method for co-producing anhydrous hydrogen bromide and a purified bisulfate salt, where a bromide salt is reacted with sulfuric acid to produce crude hydrogen bromide and crude bisulfate salt, the improvement comprising separating the crude hydrogen bromide into anhydrous hydrogen bromide and aqueous hydrogen bromide containing at least a finite amount of bromine, and removing the bromine from the aqueous hydrogen bromide in a distillation process by:

i) adding water to form a bromine/water azeotrope; and ii) azeotropically distilling off the bromine.

2. The method of claim 1, wherein the bromide salt is sodium bromide, and the bisulfate salt is sodium bisulfate.

3. The method of claim 1, wherein the aqueous hydrogen bromide is distilled in a column and the water is provided in the top portion of the column.

4. The method of claim 3, wherein the aqueous hydrogen bromide is provided in the bottom portion of the column.

5. The method of claim 4, wherein the distillation produces a top product comprising a bromine/water mixture and a bottom product comprising debrominated aqueous hydrogen bromide which contains less than about 500 ppm bromine.

6. The method of claim 5, wherein the debrominated aqueous hydrogen bromide contains less than about 300 ppm bromine.

7. The method of claim 5, wherein the debrominated aqueous hydrogen bromide contains less than about 100 ppm bromine.

8. The method of claim 5, wherein the debrominated aqueous hydrogen bromide is a bromide/water azeotrope.

9. The method of claim 5, wherein the debrominated aqueous hydrogen bromide is recycled back to the reactor.

10. The method of claim 5, wherein the bromine/water mixture is condensed and separated to provide a first steam predominantly comprising water and a second stream comprising water saturated bromine.

11. The method of claim 10, wherein the first stream is recycled back to the distillation column.

12. The method of claim 1, wherein the bromine is removed from the aqueous hydrogen bromide intermittently.

13. The method of claim 1, wherein bromide salt is reacted in a batch process.

14. The method of claim 13, wherein the reactor is further charged with aqueous hydrogen bromide.

15. The method of claim 13, wherein the bromine is removed from the aqueous hydrogen bromide in periods of once per every 5 to 10 batches.

16. In a method for co-producing anhydrous hydrogen bromide and a purified bisulfate salt, where a bromide salt is reacted with sulfuric acid to produce crude hydrogen bromide and crude bisulfate salt which contains at least a finite amount of bromide, the improvement comprising the steps of:
  i) removing the bromide from the bisulfate salt via a plurality of spray drying stages; and
  ii) adding water to the bisulfate salt in between the drying stages.

17. The method of claim 16, wherein the bromide salt is sodium bromide, and the bisulfate salt is sodium bisulfate.

18. The method of claim 16, wherein the gas comprises air and is heated to a temperature of between about 100° C. and 150° C.

19. The method of claim 18, wherein the air is heated to a temperature of between about 110° C. and 140° C.

20. The method of claim 16, wherein the purified bisulfate salt contains less than 1.5 weight percent bromide.

21. The method of claim 16, wherein the purified bisulfate salt contains less than 0.5 weight percent bromide.

22. The method of claim 16, wherein the purified bisulfate salt contains less than 0.1 weight percent bromide.

23. The method of claim 16, wherein the purified bisulfate salt contains less than 0.01 weight percent bromide.

24. In a method for co-producing anhydrous hydrogen bromide and a purified bisulfate salt in a reaction vessel, where a bromide salt is reacted with sulfuric acid to produce crude hydrogen bromide and crude bisulfate salt which contains at least a finite amount of hydrogen bromide, the improvement comprising the steps of:
  i) removing the hydrogen bromide from the bisulfate salt via a drying process; and
  ii) purifying the hydrogen bromide that is removed from the crude bisulfate by distillation.

25. The improvement according to claim 24, wherein the bisulfate salt is purified by a spray drying process wherein the bisulfate salt is dispersed into droplets, and the droplets are contacted with a heated gas.

26. The improvement according to claim 24, wherein the hydrogen bromide that is removed from the crude bisulfate salt is combined with the crude hydrogen bromide from the reaction vessel, prior to or concurrently with the distillation process.

27. The improvement according to claim 24, wherein the distillation process produces a high-boiling water/HBr azeotrope.

28. The improvement according to claim 24, further comprising the step of charging the reaction vessel with at least a portion of the water/HBr azeotrope from the distillation process.

* * * * *